United States Patent

Edakubo et al.

[11] Patent Number: 5,808,841
[45] Date of Patent: Sep. 15, 1998

[54] RECORDING AND/OR REPRODUCING APPARATUS HAVING ROTARY DRUM UNIT

[75] Inventors: Hiroo Edakubo, Kanagawa-ken; Tatsuzo Ushiro, Saitama-ken, both of Japan

[73] Assignee: Canon Kabushiki Kaisha, Tokyo, Japan

[21] Appl. No.: 839,409

[22] Filed: Apr. 14, 1997

Related U.S. Application Data

[63] Continuation of Ser. No. 509,559, Jul. 31, 1995, abandoned.

[30] Foreign Application Priority Data

Aug. 5, 1994 [JP] Japan .................................. 6-184572

[51] Int. Cl.⁶ ...................................................... G11B 15/00
[52] U.S. Cl. .............................................................. 360/107
[58] Field of Search .................................... 360/107, 128, 360/130.22

[56] References Cited

U.S. PATENT DOCUMENTS

| | | | |
|---|---|---|---|
| 4,623,944 | 11/1986 | Yamashita | 360/84 |
| 5,119,257 | 6/1992 | Itou et al. | 360/130.22 |
| 5,442,506 | 8/1995 | Kang | 360/128 |

*Primary Examiner*—Stuart S. Levy
*Assistant Examiner*—David D. Davis
*Attorney, Agent, or Firm*—Robin, Blecker & Daley

[57] ABSTRACT

An apparatus for recording and/or reproducing information on or from a tape has a fixed drum, a rotary drum, a bearing and a grounding member. The rotary drum is provided with at least one head. The bearing is disposed between the fixed drum and the rotary drum to enable the fixed drum to rotatably support the rotary drum. The fixed drum has a through hole formed within an area which corresponds to an area where the bearing is disposed. The grounding member is arranged in the through hole to be in contact with the bearing.

15 Claims, 3 Drawing Sheets

RECORDING AND/OR REPRODUCING APPARATUS HAVING ROTARY DRUM UNIT

This is a continuation application under 37 CFR 1.62 of prior application Ser. No. 08/509,559, filed Jul. 31, 1995 abandoned.

BACKGROUND OF THE INVENTION

1. Field of the Invention

This invention relates to a rotary drum unit of a recording and/or reproducing apparatus such as a video tape recorder (VTR) or the like and more particularly to grounding arrangement to be made between the upper and lower drums of the rotary drum unit.

2. Description of the Related Art

FIG. 3 of the accompanying drawings shows an example of arrangement of the conventional rotary drum unit which has been disclosed in Japanese Laid-Open Utility Model Application No. HEI 3-45209. Referring to FIG. 3, the rotary drum unit consists of a lower drum 1 which is fixed and an upper drum 2 which is rotatable. These drums 1 and 2 are arranged to exchange electrical signals between them through rotary transformers 3a and 3b. The lower drum 1 is secured to a base 4 with screws. The upper drum 2 is supported through a bearing 6 by a rotation shaft 5 secured thereto in such a way as to be rotatable relative to the lower drum 1. The upper drum 2 is provided with a magnetic head 7 for recording or reproduction on or from a magnetic tape which is not shown.

In the rotary drum unit, a grounding brush 8 which has a contact 8a in contact with the top part of the rotation shaft 5 is secured to the base 4 through a holding member 9. The grounding brush 8 and the holding member 9 are molded integrally with a resin material. These two members are provided with a conductive pattern which is not shown but is arranged to electrically connect the contact 8a to the base 4. The rotary drum unit which is arranged in this manner can be grounded by keeping the contact 8a of the grounding brush 8 in contact with the rotation shaft 5.

In the case of the conventional rotary drum unit arranged, for example, as shown in FIG. 3, the grounding brush 8 and the holding member 9 are arranged in a state of overhanging the lower drum 1 and the upper drum 2 as apparent from the drawing. This arrangement, however, has presented a problem in respect to a desire for reduction in size of the rotary drum unit, because it causes the rotary drum unit to become too bulky as a whole.

SUMMARY OF THE INVENTION

In view of the problem mentioned above, it is an object of this invention to provide a recording and/or reproducing apparatus having a rotary drum unit arranged to have a compact grounding arrangement which excels in mounting workability and yet ensures adequate grounding.

To attain this object, an apparatus for recording and/or reproducing information on or from a tape is arranged according to this invention to include: a fixed drum; a rotary drum having at lease one head arranged to be capable of recording and/or reproducing information on or from the tape; a bearing disposed between the fixed drum and the rotary drum, the fixed drum being arranged to rotatably support the rotary drum and to have a through hole formed within an area corresponding to an area where the bearing is disposed; and a grounding member arranged in the through hole to be in contact with the bearing.

The above and other object and features of this invention will become apparent from the following detailed description of an embodiment thereof taken in conjunction with the accompanying drawings.

DETAILED DESCRIPTION OF THE PREFERRED EMBODIMENT

Figure 1:
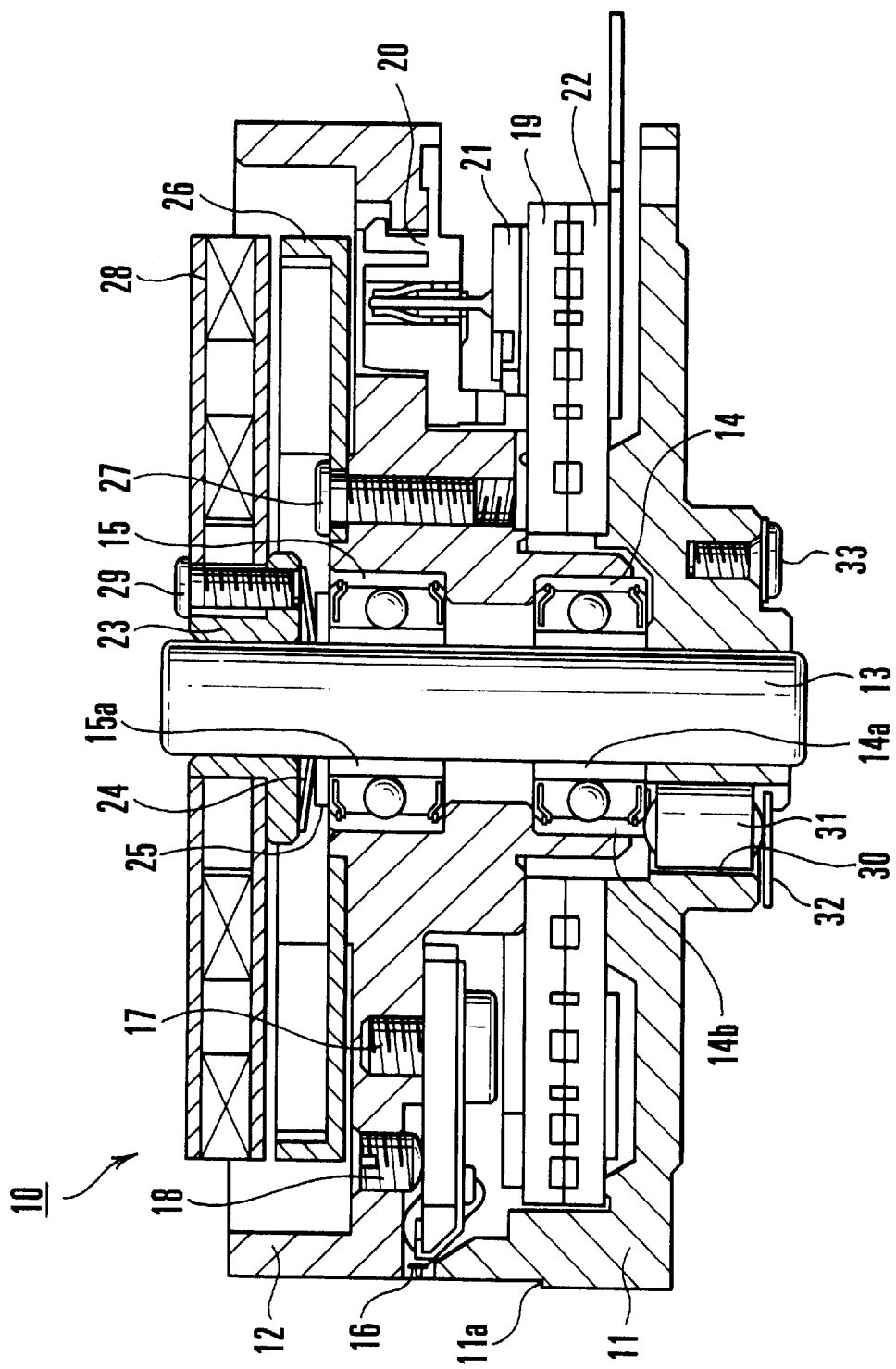
FIG. 1 is a vertical section showing a rotary drum unit of an embodiment of this invention.
Figure 2:
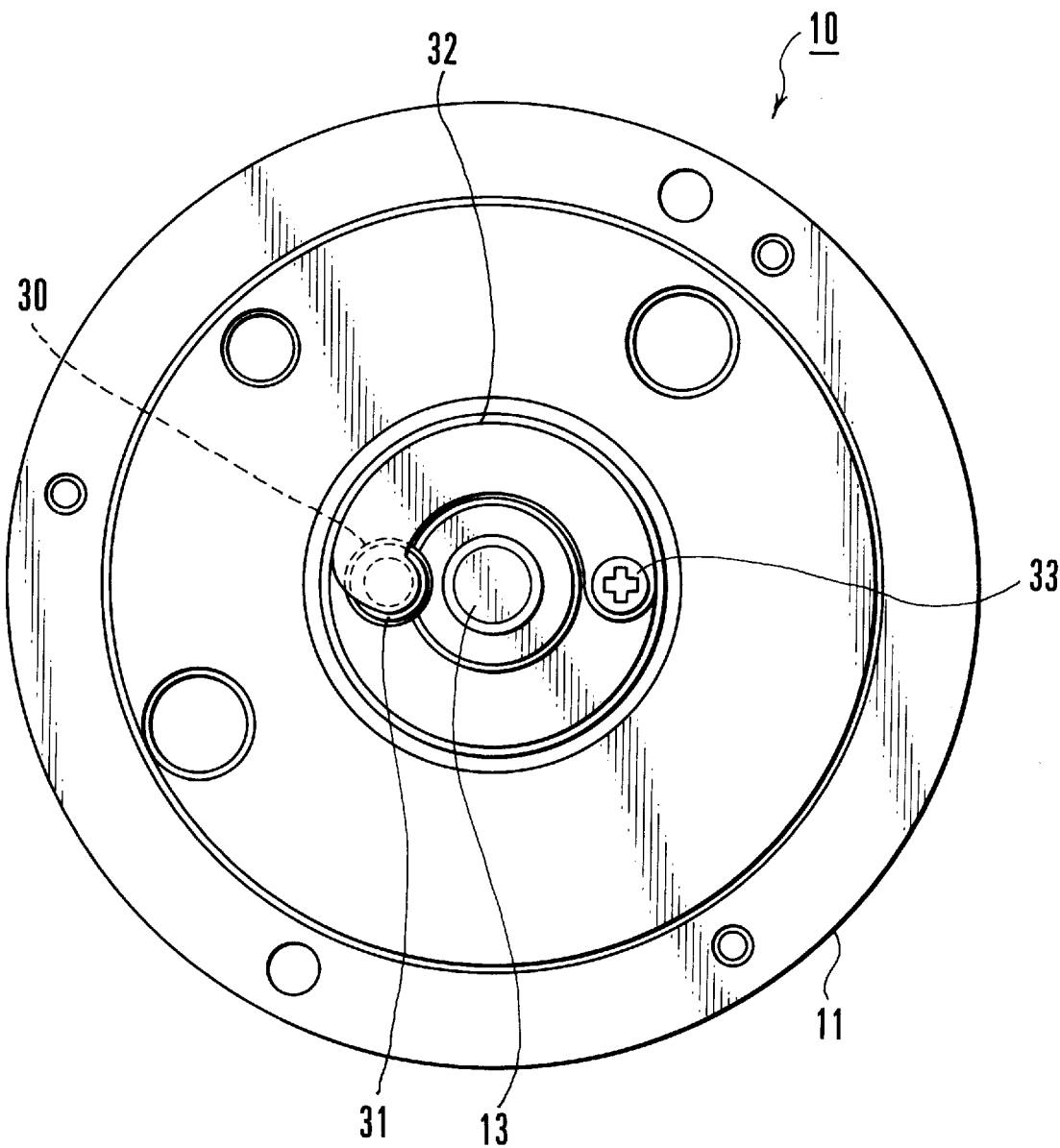
FIG. 2 is a bottom plan view showing the rotary drum unit of the embodiment of this invention.
Figure 3:
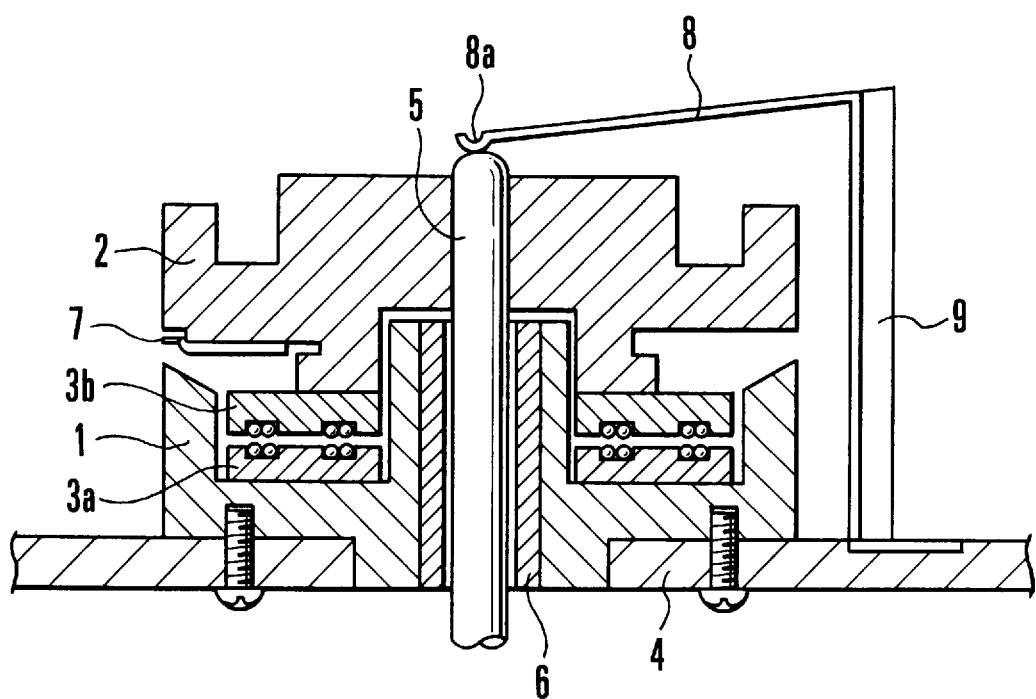
FIG. 3 is a vertical section showing by way of example the arrangement of the conventional rotary drum unit.

A preferred embodiment of this invention is described with reference to FIGS. 1 and 2 as follows FIGS. 1 and 2 are sectional and bottom plan views respectively showing a rotary drum unit 10 arranged as the embodiment of this invention. The rotary drum unit 10 is provided with a fixed lower drum 11 and an upper drum 12 which is arranged to be rotatable relative to the lower drum 11. A support shaft 13 is secured to the lower drum 11 at a high degree of precision by shrink fitting or the like. In this case, a pair of ball bearings 14 and 15 are mounted on the support shaft 13 in predetermined positions arranged in the axial direction of the support shaft 13. The abutting faces of the lower drum 11 and the ball bearing 14 are machined to precisely keep the height of a magnetic head 16 with respect to a lead 11a formed on the lower drum 11 for the purpose of guiding a magnetic tape which is not shown.

The upper drum 12 is fitted at its bearing fitting part on the ball bearings 14 and 15 by press fitting, shrink fitting or the like in such a way as to be rotatable on the support shaft 13. The magnetic head 16 is secured to the upper drum 12 with a set screw 17. However, the height position of the magnetic head 16 is arranged to be finely adjustable by means of a bending screw 18. Further, a rotary transformer rotor 19 is attached to the upper drum 12 for transmitting an electrical signal from the magnetic head 16. The rotary transformer rotor 19 and the upper drum 12 are connected through connection terminals 20 and 21. On the other hand, a rotary transformer stator 22 is attached to the lower drum 11 in a state of being opposed to the rotary transformer rotor 19. The rotary transformer stator 22 is thus arranged to have an electrical signal transmitted therethrough to a signal processing circuit which is not shown.

The inner rings 14a and 15a of the ball bearings 14 and 15 are respectively fitted on the support shaft 13 leaving a very small clearance. On the side of the ball bearing 15 on the support shaft 13, a motor base 23 is secured to the support shaft by press fitting, shrink fitting, gluing or the like at a predetermined height position in the direction of thrust. As shown in the drawing, a pre-load spring 24 and a washer 25 are fitted in between the motor base 23 and the ball bearing 15. The pre-load spring 24 is arranged to urge the ball bearing 15 in the direction of thrust with a certain amount of pressure. The spring load of the pre-load spring 24 is preferably set at about 600 g.

A motor rotor 26 is secured to the upper drum 12 with a set screw 27. At the motor base 23, a motor stator 28 is secured with a set screw 29 in a state of being opposed to the motor rotor 26. The motor rotor 26 and the motor stator 28 jointly form a motor. The rotary driving force of the motor is thus arranged to be directly imparted to the upper drum 12.

In a suitable part of the base part of the lower drum 11, there is formed a through hole 30 within an area corresponding to an area where the ball bearing 14 is disposed. A grounding brush 31 is arranged within the through hole 30. The grounding brush 31 is preferably made of carbon or a silver-carbon material and is formed, for example, in a drum-like shape having two protruding parts on its two sides as shown in the drawing. A grounding spring 32 is attached to the lower end of the lower drum 11 with a set screw 33. As shown in FIG. 2, the grounding spring 32 is formed, for example, approximately in a crescent shape with its one end fixed by the set screw 33 and the other end arranged to push one of the protruding parts of the grounding brush 31.

The grounding brush 31 which is disposed within the through hole 30 is preferably arranged to have the other protruding part caused by the elastic force of the grounding spring 32 to be in elastic contact with an outer ring 14b of the ball bearing 14 with a predetermined amount of pressure. The outer ring 14b of the ball bearing 14 is made of bearing steel and has a polished surface. It is advantageous to arrange the grounding brush 31 to come into contact with the outer ring 14b, in terms of a noise, abrasion, etc., caused by the contact with the grounding brush 31. This arrangement, however, may be changed to have the grounding brush 31 to be into contact with some suitable part of the upper drum 12 instead of with the outer ring 14b.

Assembly work on the rotary drum unit 10 which is arranged as described above is performed in the following manner. The support shaft 13 is first fitted into the lower drum 11 by shrink fitting or press fitting. Next, the rotary transformer stator 22 is attached to the lower drum 11. On the other hand, the ball bearings 14 and 15 are fitted in the bearing fitting part of the upper drum 12 by press fitting, shrink fitting or the like. The magnetic head 16 is next mounted on the upper drum 12. Then, the end part of the connection terminal 20 is connected to the magnetic head 16 by soldering. Further, while the other connection terminal 21 is being inserted into the connection terminal 20, the rotary transformer rotor 19 is attached in such a way as to have the lower drum 11 and the upper drum 12 joined together.

After this, the washer 25 and the pre-load spring 24 are attached to the support shaft 13 one after another. The motor base 23 is fitted on and secured to the support shaft 13 at a predetermined height position in the direction of thrust. With the main members of the rotary drum unit 10 thus having been assembled, the grounding brush 31 is put into the inside of the through hole 30 of the lower drum 11 and is then fixed by the grounding spring 32 to be in elastic contact with the outer ring 14b of the ball bearing 14. After the height of the magnetic head 16 is adjusted, the rotor 26 of the motor and the stator 28 of the motor are mounted.

In the rotary drum unit 10 of this embodiment, the grounding brush 31 which is disposed on the side of the lower drum 11 is arranged to be in elastically contact with the outer ring 14b of the ball bearing 14 which is arranged to rotate together with the upper drum 12. By virtue of this arrangement, grounding can be adequately carried out between the lower drum 11 and the upper drum 12 even while rotary drum unit 10 is in operation. In this case, although there is the possibility that the grounding brush 31 which is made of a relatively soft material is abrased and its powder resulting from the abrasion might intrude into the ball bearing 14, etc., the ball bearing 14 and other parts will never be damaged by the powder, because the material used for the grounding brush 31 is a soft material.

Further, the ball bearing 15 is urged with a certain amount of pressure in the direction of thrust by the elastic force of the pre-load spring 24 which serves as elastic urging means. The urging force eliminates any play and rattling in the direction of the thrust to ensure a smooth action. The arrangement of urging by means of the pre-load spring 24 effectively absorbs even the adverse effects of changes in dimensions of the component members of the rotary drum unit caused by temperature variations, so that the operation of the embodiment always can be adequately and smoothly carried out.

While this invention has been described through a preferred embodiment thereof, this invention is not limited to the specific shapes and values mentioned in the foregoing. Changes in the shapes and values may be resorted to without departing from the spirit and scopes of this invention. For example, the shape of the through holes 30 and that of the grounding brush 31 may be changed to some rectangular sectional shapes, respectively. The spring load of the pre-load spring 24 and that of the grounding spring 32 also may be set at some suitable values as desired.

As described in the foregoing, in accordance with the arrangement of the embodiment described, the grounding brush can be simply and accurately built in the rotary drum unit without affecting the high degree of precision necessary in carrying out assembly work on the upper and lower drums of the rotary drum unit. Besides, the grounding arrangement of the rotary drum unit can be compactly arranged to permit further reduction in size of the rotary drum unit. It is particularly advantageous that the embodiment is arranged to have the pre-load spring pressure maintained around the bearing members. This arrangement enables the invented rotary drum unit to effectively cope with temperature variations showing an excellent temperature characteristic and thus ensures a stable operation of the rotary drum unit.

What is claimed is:

1. An apparatus for recording and/or reproducing information on or from a tape, comprising:

a) a fixed drum;

b) a rotary drum having at least one head, said head being arranged so as to record and/or reproduce information on or from the tape;

c) a bearing disposed between said fixed drum and said rotary drum, said fixed drum being arranged to rotatably support said rotary drum and to have a through hole formed within an area where said bearing is disposed, said through hole opening into an exterior surface of said fixed drum when said rotary drum is supported by said fixed drum;

d) a grounding member arranged in said through hole to be in contact with said bearing; and e) a retaining member in contact with said grounding member and holding said grounding member in said through hole, so that said grounding member is detachable from said through hole by moving said retaining member.

2. An apparatus according to claim 1, further comprising a shaft secured to said fixed drum, said bearing being secured to said shaft.

3. An apparatus according to claim 1, wherein said bearing is a ball bearing, said ball bearing including an inner ring and an outer ring.

4. An apparatus according to claim 3, wherein said grounding member is in contact with said outer ring.

5. An apparatus according to claim 1, wherein said retaining member is arranged to urge said grounding member.

6. An apparatus according to claim 5, wherein said retaining member is arranged so as to surround a shaft supported by the bearing.

7. An apparatus according to claim 6, wherein said retaining member is arranged to push said grounding member at one end thereof and to have the other end thereof secured to said fixed drum.

8. A rotary drum unit comprising:

a) a first drum;

b) a second drum having at least one head;

c) a bearing disposed between said first drum and said second drum, said first drum arranged to rotatably support said second drum, and said first drum having a through hole formed within an area where said bearing is disposed, said through hole opening into exterior surface of said first drum when said second drum is supported by said first drum;

d) a grounding member arranged in said through hole to be in contact with said bearing; and e) a retaining member in contact with said grounding member and holding said grounding member in said through hole, so that said grounding member is detachable from said through hole by moving said retaining member.

9. A rotary drum unit according to claim 8, wherein said head is arranged to be capable of recording and/or reproducing information on or from a recording medium.

10. A rotary drum unit according to claim 9, further comprising a shaft secured to said first drum, said bearing being secured to said shaft.

11. A rotary drum unit according to claim 10, wherein said bearing is a ball bearing, said ball bearing including an inner ring and an outer ring.

12. A rotary drum unit according to claim 11, wherein said grounding member is in contact with said outer ring.

13. A rotary drum unit according to claim 8 or 9, wherein said retaining member is arranged to urge said grounding member.

14. A rotary drum unit according to claim 13, wherein said retaining member is arranged so as to surround a shaft supported by the bearing.

15. A rotary drum unit according to claim 14, wherein said retaining member is arranged to push said grounding member at one end thereof and to have the other end thereof secured to said first drum.

* * * * *